(12) United States Patent
Rofougaran (10) Patent No.: US 8,059,706 B2
(45) Date of Patent: *Nov. 15, 2011

(54) METHOD AND SYSTEM FOR TRANSMISSION AND/OR RECEPTION OF SIGNALS UTILIZING A DELAY CIRCUIT AND DDFS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 557 days.

This patent is subject to a terminal disclaimer.

(21) Appl. No.: 11/860,128

(22) Filed: Sep. 24, 2007

(65) Prior Publication Data

US 2009/0080541 A1 Mar. 26, 2009

(51) Int. Cl.
*H04B 3/46* (2006.01)
(52) U.S. Cl. .......... 375/230; 375/229; 333/18; 708/300; 708/819
(58) Field of Classification Search .................... 375/230
See application file for complete search history.

(56) References Cited

U.S. PATENT DOCUMENTS

| | | | | | |
|---|---|---|---|---|---|
| 3,573,624 | A | * | 4/1971 | Hartmann et al. | 375/230 |
| 3,857,048 | A | * | 12/1974 | De Laage de Meux et al. | 327/179 |
| 4,411,019 | A | * | 10/1983 | Rypkema | 455/180.2 |
| 4,459,698 | A | * | 7/1984 | Yumoto et al. | 375/236 |
| 4,922,206 | A | * | 5/1990 | Nicholas | 329/304 |
| 4,992,761 | A | * | 2/1991 | Seely et al. | 333/118 |
| 5,309,299 | A | * | 5/1994 | Crossland et al. | 360/77.01 |
| 5,774,493 | A | * | 6/1998 | Ross | 375/142 |
| 5,809,064 | A | * | 9/1998 | Fenton et al. | 375/150 |
| 5,926,052 | A | * | 7/1999 | Dow et al. | 327/234 |
| 5,977,805 | A | * | 11/1999 | Vergnes et al. | 327/107 |
| 6,259,283 | B1 | | 7/2001 | Nguyen | |
| 6,366,174 | B1 | * | 4/2002 | Berry et al. | 331/78 |
| 6,370,189 | B1 | | 4/2002 | Morrison et al. | |
| 6,396,358 | B1 | * | 5/2002 | Poss et al. | 331/57 |
| 6,414,555 | B2 | * | 7/2002 | Staszewski et al. | 331/18 |
| 6,717,479 | B2 | | 4/2004 | Suda | |
| 6,810,087 | B2 | * | 10/2004 | Hoctor et al. | 375/259 |
| 7,068,715 | B2 | * | 6/2006 | Hoctor et al. | 375/239 |
| 7,173,464 | B2 | | 2/2007 | Nagasue | |
| 7,233,774 | B2 | * | 6/2007 | Behzad | 455/76 |

(Continued)

OTHER PUBLICATIONS

Office Action dated Aug. 6, 2009, U.S. Appl. No. 11/860,152, filed Sep. 24, 2007.

(Continued)

*Primary Examiner* — Chieh M Fan
*Assistant Examiner* — Santiago Garcia
(74) *Attorney, Agent, or Firm* — McAndrews, Held & Malloy, Ltd.

(57) ABSTRACT

Aspects of a method and system for transmission and/or reception of signals utilizing a delay circuit and a DDFS are provided. In this regard, a first signal may be delayed by 90°, via a plurality of delay elements and variable capacitance, to generate a second signal. The first and second signal may be mixed to generate a first LO signal, which may be utilized for a first frequency conversion. A second LO signal may be generated via a DDFS and may be utilized for a second frequency conversion. A digital input word of the DDFS, a value of the variable capacitance, and/or at least a portion of the delay elements, may be programmatically controlled based on a desired frequency for transmission and/or desired frequency for reception. The first frequency conversions may be up-conversions and/or down-conversions to/from baseband, one or more intermediate frequencies, and/or RF.

32 Claims, 7 Drawing Sheets

U.S. PATENT DOCUMENTS

| | | | |
|---|---|---|---|
| 7,251,460 B2 * | 7/2007 | Khatri | 455/101 |
| 7,482,885 B2 * | 1/2009 | Sridharan | 331/49 |
| 7,495,489 B2 * | 2/2009 | Wu et al. | 327/161 |
| 7,519,349 B2 * | 4/2009 | Sridharan | 455/285 |
| 7,548,181 B1 * | 6/2009 | Bausov | 342/22 |
| 7,555,072 B2 * | 6/2009 | Kim | 375/343 |
| 7,570,926 B2 * | 8/2009 | Behzad | 455/76 |
| 7,599,977 B2 * | 10/2009 | Ammar | 708/271 |
| 7,605,629 B2 * | 10/2009 | Kuo et al. | 327/261 |
| 7,617,342 B2 * | 11/2009 | Rofougaran | 710/100 |
| 7,672,800 B2 * | 3/2010 | Rofougaran | 702/89 |
| 7,683,722 B2 * | 3/2010 | Rofougaran | 331/16 |
| 2002/0153972 A1 * | 10/2002 | Hershtig | 333/202 |
| 2003/0128071 A1 * | 7/2003 | Nguyen et al. | 330/254 |
| 2004/0017847 A1 | 1/2004 | Alberth, Jr. et al. | |
| 2004/0152437 A1 * | 8/2004 | Behzad | 455/326 |
| 2004/0189406 A1 * | 9/2004 | Shah et al. | 331/57 |
| 2006/0141973 A1 * | 6/2006 | Behrens et al. | 455/313 |
| 2006/0229046 A1 * | 10/2006 | Bult et al. | 455/252.1 |
| 2007/0049236 A1 * | 3/2007 | Naito | 455/323 |
| 2007/0273422 A1 * | 11/2007 | Kuo et al. | 327/261 |
| 2008/0095224 A1 * | 4/2008 | Takada | 375/230 |
| 2008/0232506 A1 * | 9/2008 | Fujita et al. | 375/295 |
| 2008/0265999 A1 * | 10/2008 | Wan et al. | 331/16 |
| 2009/0033384 A1 * | 2/2009 | Nagaraj et al. | 327/158 |
| 2009/0080541 A1 * | 3/2009 | Rofougaran | 375/259 |

OTHER PUBLICATIONS

Response to Office Action dated Nov. 4, 2009, U.S. Appl. No. 11/860,152, filed Sep. 24, 2007.
USPTO Office Action dated Jun. 17, 2010 for, U.S. Appl. No. 11/860,106, filed Sep. 24, 2007, Inventor: Ahmadreza Rofougaran.
Sep. 16, 2010 Response to Office Action dated Jun. 17, 2010, U.S. Appl. No. 11/860,106, filed Sep. 24, 2007.
USPTO Office Action dated Nov. 24, 2010 for, U.S. Appl. No. 11/860,106, filed Sep. 24, 2007, Inventor: Ahmadreza Rofougaran.
USPTO Office Action dated May 25, 2010 for, U.S. Appl. No. 11/860,076, filed Sep. 24, 2007, Inventor: Ahmadreza Rofougaran.
Aug. 25, 2010 Response to Office Action dated May 25, 2010, U.S. Appl. No. 11/860,076, filed Sep. 24, 2007.
USPTO Office Action dated Oct. 28, 2010 for, U.S. Appl. No. 11/860,076, filed Sep. 24, 2007, Inventor: Ahmadreza Rofougaran.
Jan. 28, 2011 Response under Rule 111 Accompanying RCE Under Rule 11 to USPTO Office Action dated Oct. 28, 2010 for, U.S. Appl. No. 11/860,076, filed Sep. 24, 2007, Inventor: Ahmadreza Rofougaran.

* cited by examiner

METHOD AND SYSTEM FOR TRANSMISSION AND/OR RECEPTION OF SIGNALS UTILIZING A DELAY CIRCUIT AND DDFS

CROSS-REFERENCE TO RELATED APPLICATIONS/INCORPORATION BY REFERENCE

This patent application makes reference to:
U.S. patent application Ser. No. 11/860,076 filed on Sep. 24, 2007, published as United States Patent Publication 2009/0079474;
U.S. patent application Ser. No. 11/860,106 filed on Sep. 24, 2007 published as United States Patent Publication 2009/0079475; and
U.S. patent application Ser. No. 11/860,152 filed on Sep. 24, 2007 published as United States Patent Publication 2009/0079482.

Each of the above stated applications is hereby incorporated herein by reference in its entirety.

FIELD OF THE INVENTION

Certain embodiments of the invention relate to signal processing. More specifically, certain embodiments of the invention relate to a method and system for transmission and/or reception of signals utilizing a delay circuit and a direct digital frequency synthesizer (DDFS).

BACKGROUND OF THE INVENTION

With the rapidly increasing dependence on electronic communications and the accompanying efforts to make these communications faster and cheaper, the complexity of designing communications systems is also increasing. For example, available frequency bands, which are regulated by organizations such as the FCC in the USA, are becoming increasingly scarce. Moreover, existing frequency bands are becoming increasingly congested due to the plethora of users and devices in existence. Accordingly, efforts exist to develop wireless technologies which operate at higher, less congested frequencies.

For example, in 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications'. With respect to the accessibility of this designated portion of the spectrum, 60 GHz communications is similar to other forms of unlicensed spectrum use, for example Wireless LANs or Bluetooth in the 2.4 GHz ISM bands. One advantage associated with 60 GHz communications is that since a very large bandwidth of 7 GHz is available, very high data rates may be achieved. However, a disadvantage of 60 GHz communications is that conventional processes, technologies, and circuit topologies may be unable to realize circuits for transmitting, receiving, or otherwise processing signals of up to extremely high frequencies.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for transmission and/or reception of signals utilizing a delay circuit and a DDFS substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transmission and/or reception of signals up to extremely high frequencies utilizing a delay circuit. Aspects of a method and system for transmission and/or reception of signals utilizing a delay circuit and a DDFS are provided. In this regard, a first signal may be delayed by 90°, via a plurality of delay elements and variable capacitance, to generate a second signal. The first and second signal may be mixed to generate a first LO signal, which may be utilized for a first frequency conversion. A second LO signal may be generated via a DDFS and may be utilized for a second frequency conversion. A digital input word of the DDFS, a value of the variable capacitance, and/or at least a portion of the delay elements, may be programmatically controlled based on a desired frequency for transmission and/or desired frequency for reception. The first frequency conversions may be up-conversions and/or down-conversions to/from baseband, one or more intermediate frequencies, and/or RF.

Figure 1:
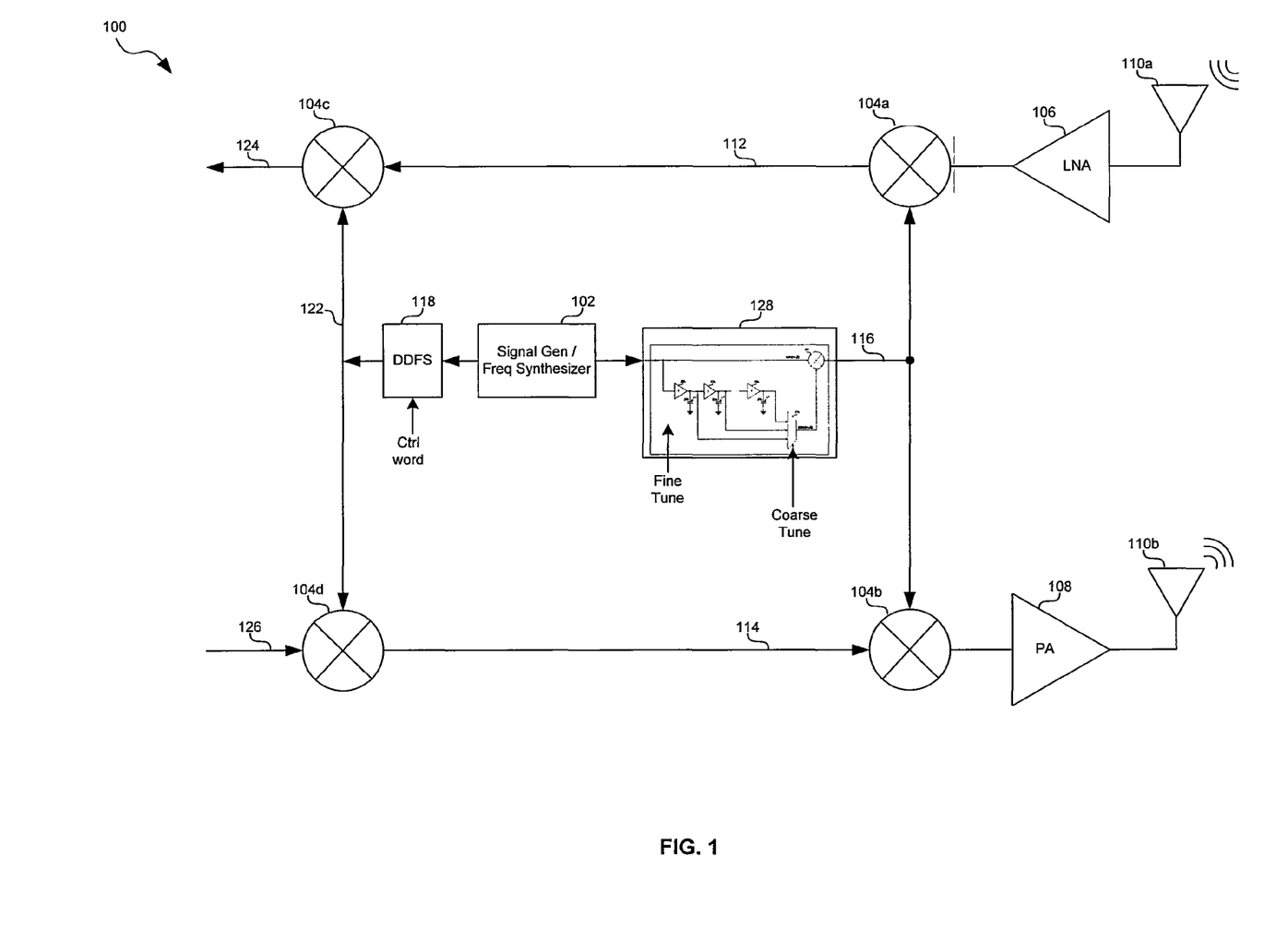
FIG. 1 is a diagram of a transceiver comprising a delay circuit and a DDFS which may enable transmission and/or reception of signals up to EHF, in accordance with an embodiment of the invention.

FIG. 1 is a diagram of a transceiver comprising a delay circuit and a DDFS which may enable transmission and/or reception of signals up to EHF, in accordance with an embodiment of the invention. Referring to FIG. 1 there is shown a transceiver 100 which may be at least a portion of the RF receiver 723a of FIG. 7, for example. The transceiver 100 may comprise a signal generator 102, a DDFS 118, a delay circuit 128, mixers 104a and 104b, a low noise amplifier (LNA) 106, a power amplifier (408), and antennas 110a and 110b.

The signal generator 102 may comprise suitable logic, circuitry, and/or code that may enable generating a sine wave. In this regard, the signal generator 102 may be enabled to generate a reference frequency for use, for example, as a local oscillator. For example, the signal generator 102 may comprise one or more PLLs. Accordingly, the maximum frequency which the signal generator 102 may be capable of generating may be limited due, for example, to settling times and/or physical constraints.

Figure 6:
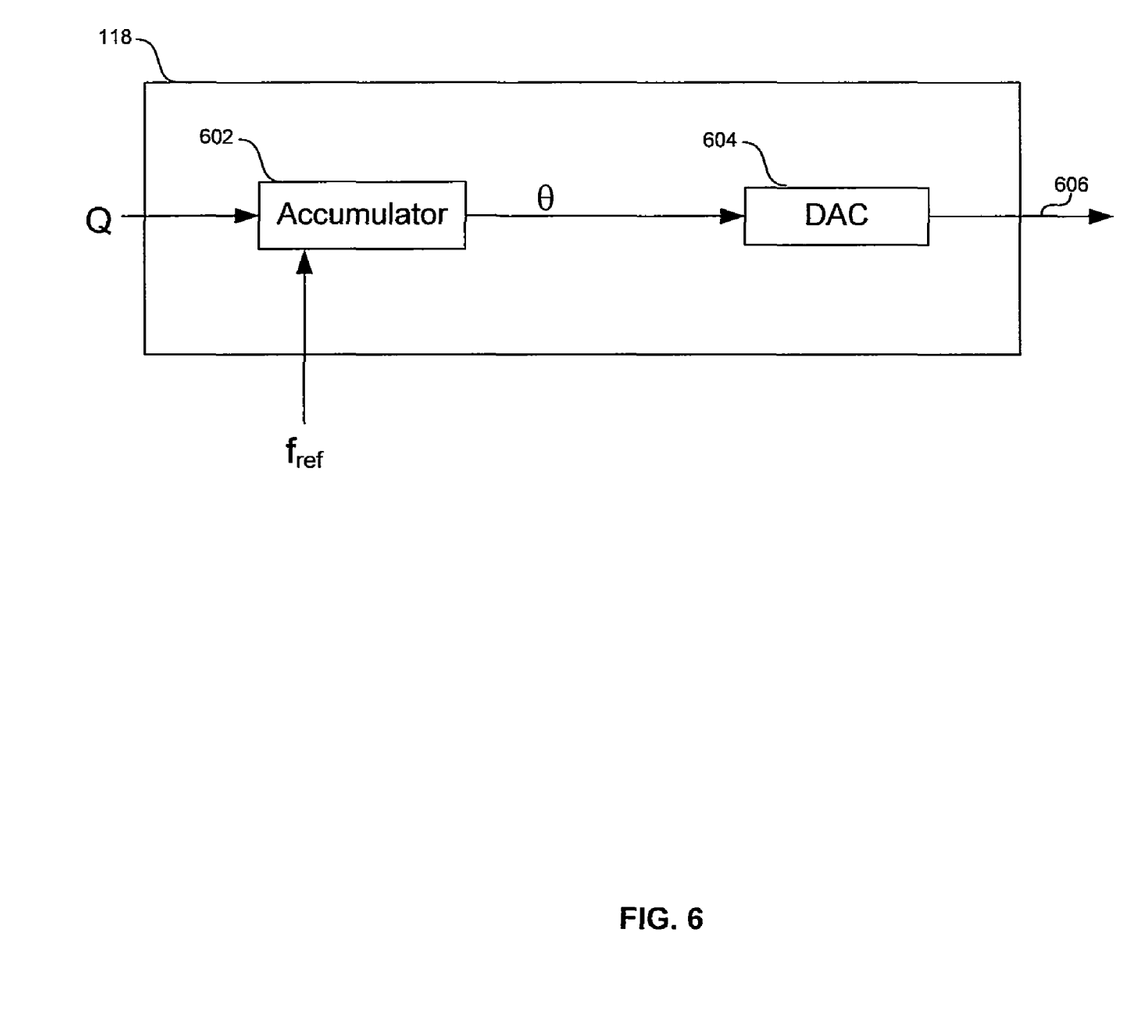
FIG. 6 is a block diagram of a direct digital frequency synthesizer utilized in generating LO signals, in accordance with an embodiment of the invention.

The DDFS block 118 may comprise suitable logic circuitry and/or code that may enable generation of signals, such as local oscillator signal 122, based on a digital control word and a reference signal from the signal generator 102. The control word may be generated by the processor 725 or the processor 729. FIG. 6 illustrates details of an exemplary DDFS block.

The delay circuit 128 may comprise suitable logic, circuitry, and/or code for outputting a frequency that is twice an input frequency. In this regard, the delay circuit 128 may be as described in FIG. 4.

The mixers 104a, 104b, 104c, and 104d may comprise suitable logic, circuitry, and/or code that may enable generation of inter-modulation products. In this regard, the mixers 104a and 104b may be similar to or the same as the mixer 104 described in FIG. 4.

The LNA 106 may comprise suitable logic, circuitry, and/or code that may enable buffering and/or amplification of received RF signals. In this regard, the gain of the LNA 106 may be adjustable to enable reception of signals of varying strength. Accordingly, the LNA 106 may receive one or more control signals from a processor such as the processors 725 and 729 of FIG. 7.

The PA 108 may comprise suitable logic, circuitry, and/or code that may enable buffering and/or amplification of a RF signal and outputting the signal to an antenna for transmission. In this regard, the gain of the PA 108 may be adjustable and may enable transmission of signals of varying strength. Accordingly, the PA 108 may receive one or more control signals from a processor such as the processors 725 and 729 of FIG. 7.

The antennas 110a and 110b may comprise suitable logic, circuitry, and/or code that may enable reception and/or transmission of signals. In various embodiments of the invention there may be separate transmit and receive antennas, as depicted, or there may be a single antenna for both transmit and receive functions.

In operation, the signal generator 102 may generate a reference signal of frequency F1. The delay circuit 128 may receive the signal F1 and may output a local oscillator (LO) signal 116 of frequency 2*F1. Similarly, the DDFS 118 may receive the signal F1 and may output LO signal 122. In this manner the DDFS 118 may enable converting between IF and baseband.

In an exemplary receive operation, RF signals may be received by the antenna 110a and may be conveyed to the LNA 106. The LNA 106 may amplify the received signal and convey it to the mixer 104a. In this regard, the gain of the LNA 106 may be adjusted based on received signal strength. Additionally, the gain of the LNA 106 may be controlled via one or more control signals from, for example, a processor such as the processors 725 and 729 of FIG. 7. The LO signal 116 may be conveyed to the mixer 104a such that the received signal of frequency $F_{RF}$ may be down-converted to an IF signal 112.

The LO signal 122 may be conveyed to the mixer 104c such that the IF signal 112 may be down-converted to a baseband signal 124. The baseband signal 124 may be conveyed, for example, to a baseband processor such as the baseband processor 729 of FIG. 7.

Figure 7:
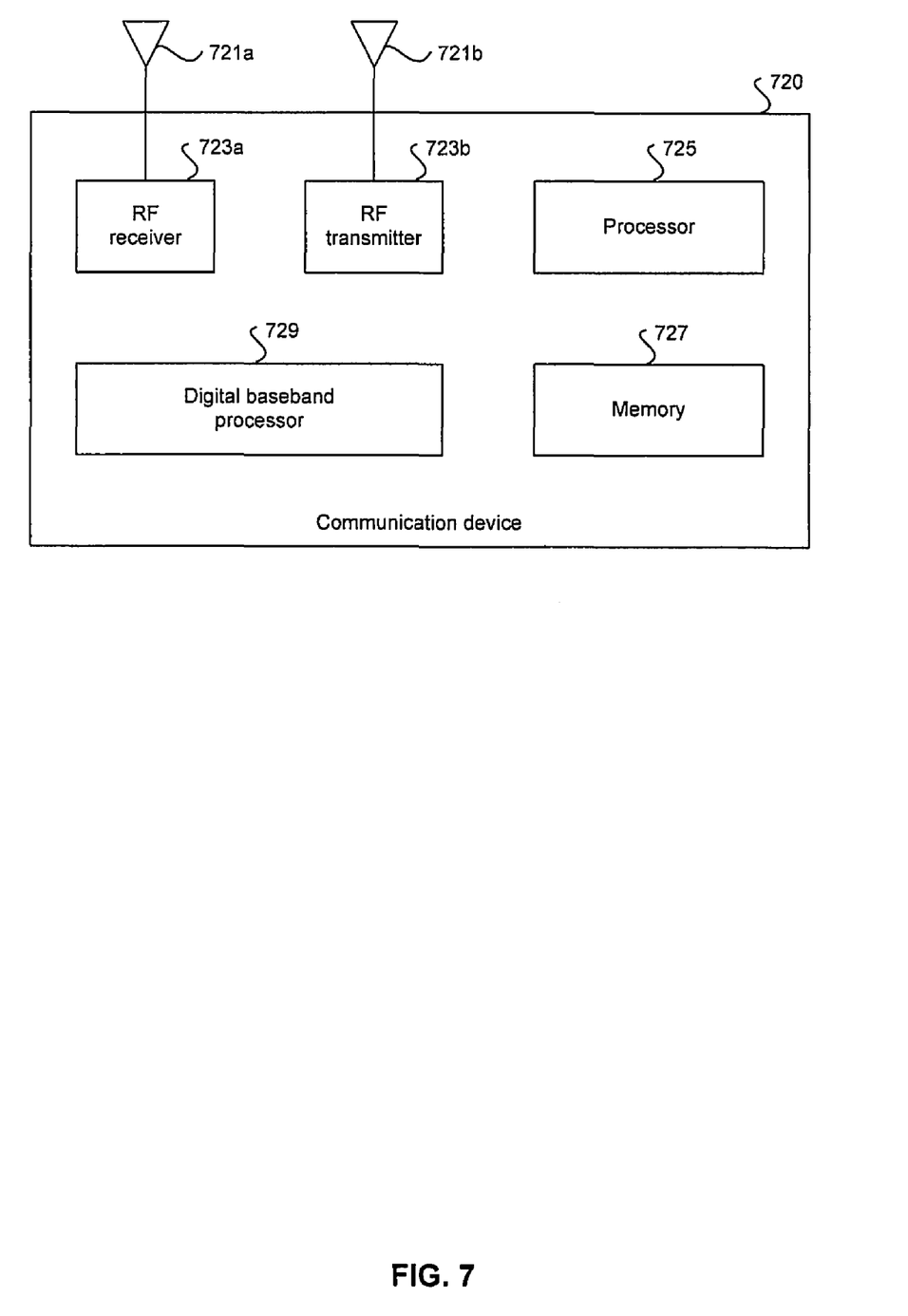
FIG. 7 is a block diagram illustrating an exemplary RF communication device, in accordance with an embodiment of the invention.

In an exemplary transmit operation, a baseband signal may be generated by, for example, the baseband processor 729 of FIG. 7. Accordingly, the baseband signal 126 and the LO signal 116 may be conveyed to the mixer 104d such that the baseband signal 126 may be up-converted to an IF signal 114. The IF signal 114 and the LO signal 116 may be conveyed to the mixer 104b which may up-convert the IF signal 114 to RF for transmission via the PA 108 and the antenna 110b. In this regard, the gain of the PA 108 may be adjusted via one or more control signals from, for example, a processor such as the processors 725 and 729 of FIG. 7.

Figure 2:
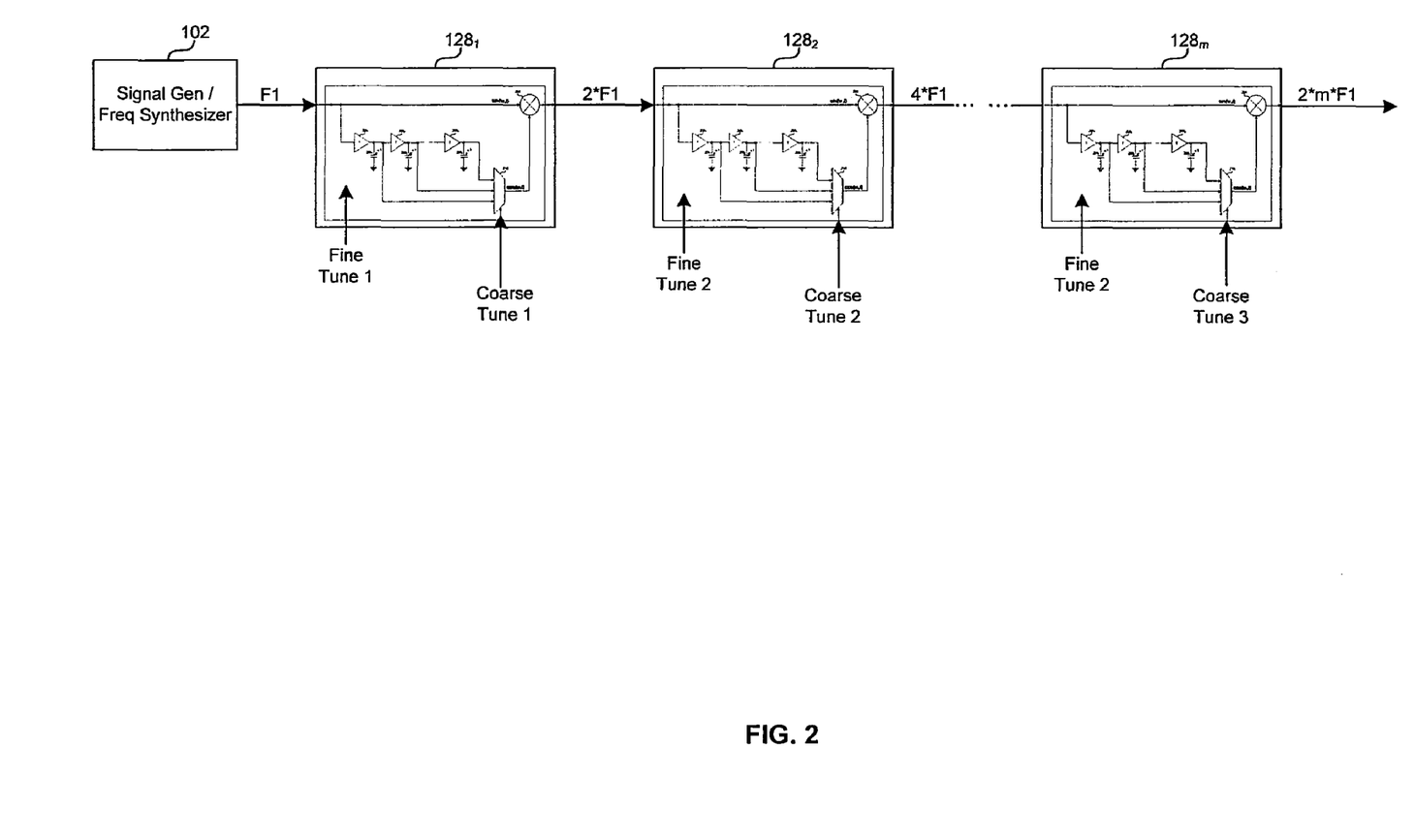
FIG. 2 is a diagram of a transceiver comprising a plurality of delay circuits and a DDFS which may enable transmission and/or reception of signals up to EHF, in accordance with an embodiment of the invention.

FIG. 2 is a block diagram illustrating a cascading of multiple delay circuits, in accordance with an embodiment of the invention. Referring to FIG. 2 there is shown a signal generator 102 and a plurality of delay circuits $128_1, \ldots, 128_m$.

Figure 4:
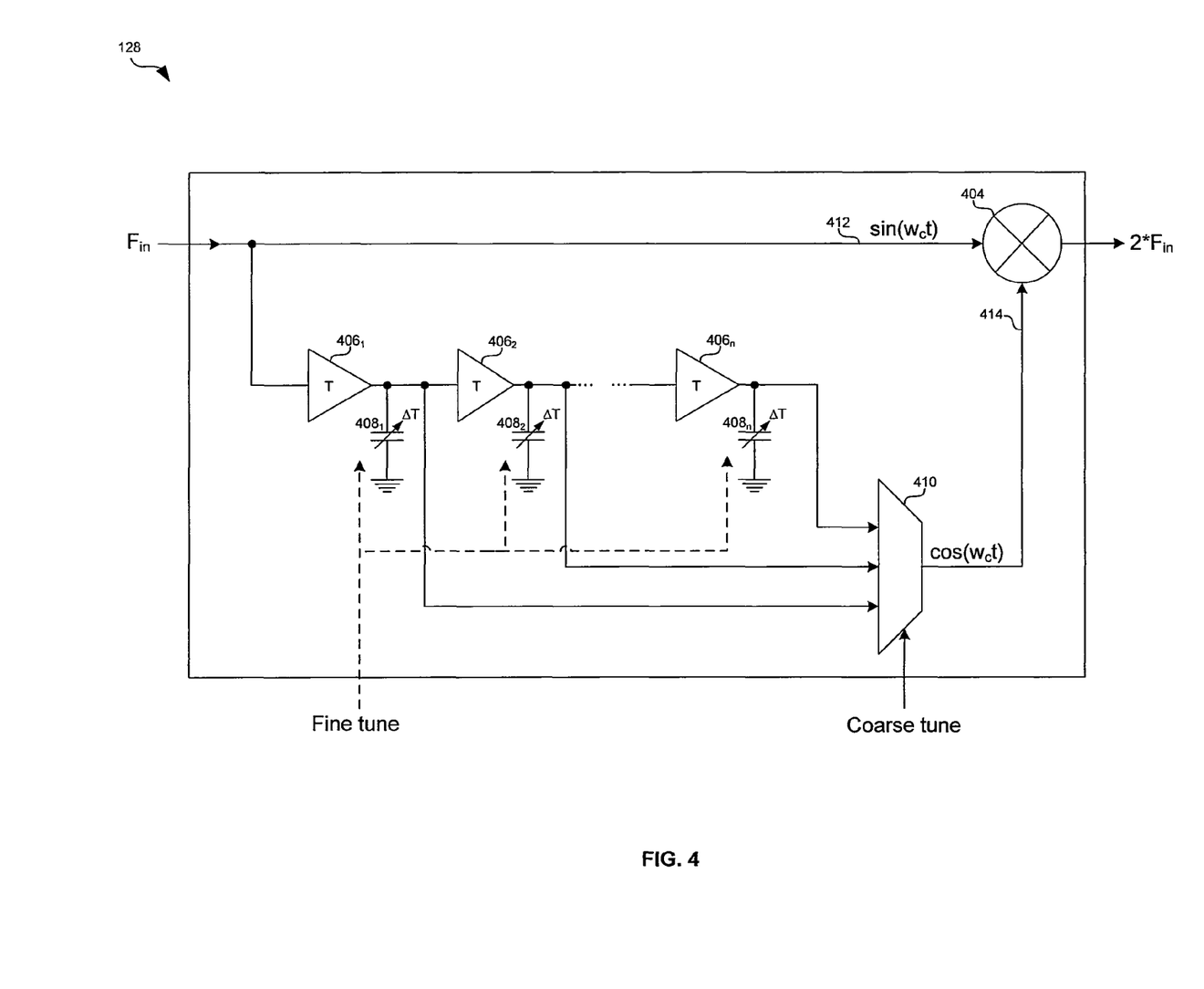
FIG. 4 is a block diagram illustrating a delay circuit for the generation of signals of up to extremely high frequencies, in accordance with an embodiment of the invention.

Each of the delay circuits $128_1, \ldots, 128_m$ may similar to or the same as the block 128 described in FIG. 4. Accordingly, each delay circuit $128_i$ may be enabled to output a signal of twice the frequency of the input signal. Accordingly, the frequency of the $m^{th}$ delay circuit may be equal to $$F_{out} = 2^m \cdot F_{in} \quad \text{EQ. 1}$$

where $F_{in}$ is the input to the first delay circuit and $F_{out}$ is the output frequency of the $m^{th}$ delay circuit.

In operation, each delay circuit $128_1, \ldots, 128_m$ may be controlled via a course control input and a fine control input. In this regard, the course control input of the $i^{th}$ delay circuit may control the number of delay elements comprising the delay circuit $128_i$ through which the signal propagates. Additionally the fine control input of the $i^{th}$ delay circuit $128_i$ may control the capacitance at the output of one or more delay elements. In this regard, the coarse control and/or fine control inputs may be manually controlled or programmatically controlled via, for example, one or more processors, such as the processor 725 of FIG. 7.

Figure 3:
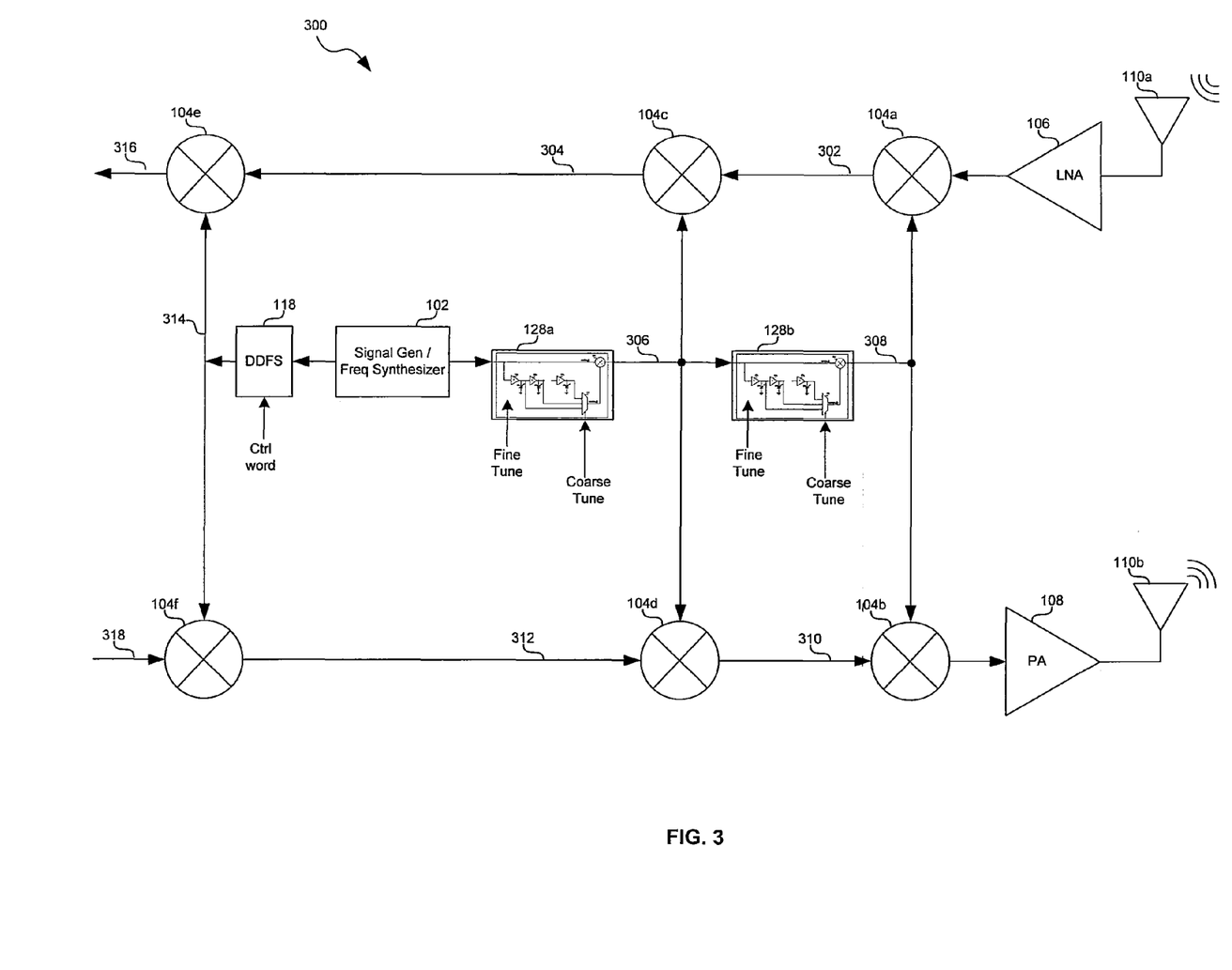
FIG. 3 is a diagram of a transceiver comprising a plurality of delay circuits which may enable transmission and/or reception of signals up to EHF, in accordance with an embodiment of the invention.

FIG. 3 is a diagram of a transceiver comprising a plurality of delay circuits which may enable transmission and/or reception of signals up to EHF, in accordance with an embodiment of the invention. Referring to FIG. 3 there is shown a transceiver 300 comprising a signal generator 102, delay circuits 128a and 128b, mixers 104a, 104b, 104c, 104d, 104e, and 104f, an LNA 106, a PA 108, a DDFS 116, and antennas 110a and 110b.

The signal generator 102, the LNA 106, and the PA 108 may be as described in FIG. 1. The mixers 104a, 104b, 104c, 104d, 104e, and 104f may be similar to or the same as the mixers 104a, 104b, 104c, 104d described in FIG. 1. The delay circuits 128a and 128b may similar to or the same as the delay circuit 128 described in FIG. 4. Accordingly, signals of frequency $2^m \cdot F_{in}$ may be generated by cascading 'm' delay circuits as described in FIG. 2.

In operation, the signal generator 102 may generate a reference signal of frequency F1. The delay circuit 128a may receive the signal F1 and may output a local oscillator (LO) signal 306 of frequency 2·F1. The delay circuit 128b may receive the signal 306 and may output a local oscillator (LO) signal 308 of frequency 4*F1. In various embodiments of the invention, additional delay circuits 128 cascaded with delay circuits $128_1$ and $128_2$ may further increase the LO frequency as depicted in FIG. 2. In this regard, F1 and the number of delay circuits may be chosen based on desired RF and/or IF frequencies. The DDFS 118 may also receive the signal of frequency F1 from the signal generator 102 and may generate the LO signal 314. In this manner the DDFS 118 may enable converting between IF and baseband.

In an exemplary receive operation, RF signals may be received by the antenna 110a and may be conveyed to the LNA 106. The LNA 106 may amplify the received signal and convey the resulting amplified signal to the mixer 104a. In this regard, the gain of the LNA 106 may be adjusted based on received signal strength. Additionally, the gain of the LNA 106 may be controlled via one or more control signals from, for example, a processor such as the processors 725 and 729 of FIG. 7. The LO signal 308 may be conveyed to the mixer 104a such that the received signal of frequency $F_{RF}$ may be down-converted to a first IF signal 302. The LO signal 306 may be conveyed to the mixer 104c such that the IF signal 302 may be down-converted to a second IF signal 304. The LO signal 314 may be conveyed to the mixer 104e such that the second IF signal 304 may be down-converted to a baseband signal 316. The baseband signal 316 may be conveyed, for example, to a processor such as the baseband processor 729 of FIG. 7.

In an exemplary transmit operation, a baseband signal 318 may be generated by, for example, the baseband processor 729 of FIG. 7. Accordingly, the baseband signal 318 and the LO signal 314 may be conveyed to the mixer 104f such that the baseband signal 314 may be up-converted to a first IF signal 312. The first IF signal 312 and the LO signal 306 may be conveyed to the mixer 104d which may up-convert the first IF signal 312 to a second IF signal 310. The second IF signal 310 and the LO signal 308 may be conveyed to the mixer 104b which may up-convert the second IF signal 310 to RF for transmission via the PA 108 and the antenna 110b. In this regard, the gain of the PA 108 may be adjusted via one or more control signals from, for example, a processor such as the processors 725 and 729 of FIG. 7.

FIG. 4 is a block diagram illustrating a delay circuit for the generation of signals of up to extremely high frequencies, in accordance with an embodiment of the invention. Referring to FIG. 4 there is shown a delay circuit 128 which may comprise a plurality of delay elements 406, a plurality of capacitances 408, a switching element 410, and a mixer 404.

The delay elements 406 may each comprise suitable logic, circuitry, and/or code that may enable delaying an RF signal. In an exemplary embodiment of the invention, the delay elements 406 may comprise CMOS buffers and/or inverters. In various embodiments of the invention there may be 'n' delay elements $406_1$, $406_2$, . . . , $406_n$. In one embodiment of the invention, each delay element 406 may introduce a time delay 'T'. In other embodiments of the invention, each of the delay elements 406 may be enabled to generate a fixed phase delay. Accordingly, in one aspect of the invention, a plurality of the delay elements may be configured so as to generate a variable delay.

Each of the capacitances 408 may comprise one or more capacitors which may be programmatically controlled. In one embodiment of the invention, each capacitance 408 may comprise a plurality of capacitors coupled via a switch network. Accordingly, the capacitance may be controlled via a digital control word. In another embodiment of the invention, each capacitance 408 may comprise one or more varactors which may be programmably controlled via one or more voltages. The processor 725 may be utilized to generate or acquire the digital control word, which may be utilized for programmably controlling the capacitance 408.

The switching element 410 may comprise suitable logic, circuitry, and/or code that may enable selecting which delay element 406 output to route to the mixer 404. An amount by which a signal is delayed may be proportional to the number of delay elements 406 through which the signal propagates. In this manner, the amount of delay introduced may be coarsely tuned by altering the number of delay elements through which a signal propagates. Accordingly, a number of delay elements which introduces a delay closest to 90° may be selected.

The mixer 404 may comprise suitable logic, circuitry, and/or code that may enable generation of inter-modulation products resulting from mixing the input signal 412 and the delayed signal 414. In various embodiments of the invention, the output of the mixer may be filtered such that desired inter-modulation products are passed with less attenuation than undesired inter-modulation products. For example, the output may be bandpass filtered with a center frequency of $2*F_{in}$.

In operation, the delay circuit 128 may enable doubling the frequency of an input signal 412. In this regard, a the input signal 412, with frequency $F_{in}$, may be represented as $\sin(\omega_c t)$, where '$\omega_c$' is angular frequency and 't' is time. The reference signal 412 may be coupled to the mixer 404 and to a first of one or more delay elements 406. The one or more delay elements 406 combined with one or more capacitances may enable delaying $F_{in}$ by 90°, thus generating a signal which may be represented as $\cos(\omega_c t)$. In this regard, controlling the number of delay elements 406 through which the signal propagates may enable course control of the amount of delay. Additionally, controlling the amount of capacitance 408 may enable fine control of the amount of delay. The delayed signal 414 may be applied to a second input of the mixer 404. Accordingly, mixing a signal that may be represented by $\sin(\omega_c t)$ with signal that may be represented by $\cos(\omega_c t)$ may result in a signal that may be represented by $\sin(2\omega_c t)$.

Figure 5:
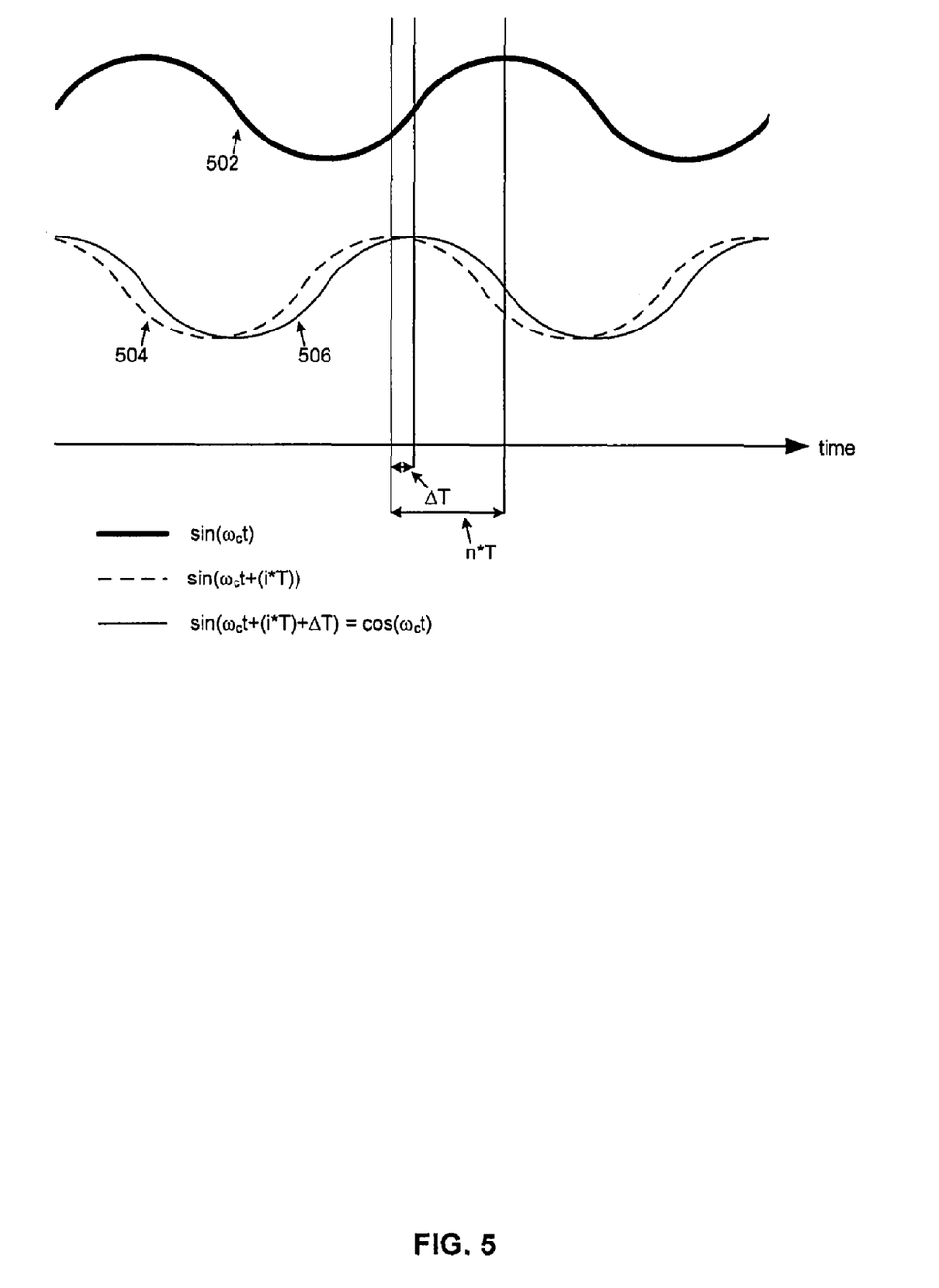
FIG. 5 is a diagram illustrating operation of a digital delay, in accordance with an embodiment of the invention.

FIG. 5 is a diagram illustrating operation of a delay circuit, in accordance with an embodiment of the invention. Referring to FIG. 5 there is shown a sine wave 502, and two delayed signals 504 and 508.

The sine wave 502 may, for example, comprise a reference signal such as the input signal 412 of FIG. 4. In this regard, the sine wave 502 may be output by a signal generator circuit such as a phase locked loop (PLL) or a direct digital frequency synthesizer (DDFS). In this regard, a maximum frequency of the sine wave 502 may be limited due to limitations of the signal generation circuit. Accordingly, by utilizing high speed delay circuits and a mixer, higher frequencies may be generated from the signal 502.

The signal 504 may comprise a delayed version of the signal 502. In this regard, the signal 504 may be delayed by an integer multiple of fixed time periods, T. Accordingly, the signal 504 may be the output of a cascade of one or more delay elements 406. In this manner, by controlling the number of delay elements 406 through which the signal 502 propagates, the signal 504 may be delayed by an amount roughly equal to 90° relative the signal 502.

The signal 506 may comprise a delayed version of the signal 502. In this regard, the signal 506 may be delayed by an integer multiple of fixed time periods, T, plus an amount ΔT. Accordingly, the signal 506 may be the output of a cascade of one or more delay elements 406 with one or more capacitances 408 coupled to the output. In this manner, by controlling the capacitance 408, the signal 506 may be delayed by an amount more precisely equal to 90° relative the signal 502.

FIG. 6 is a block diagram of a direct digital frequency synthesizer utilized in generating LO signals, in accordance with an embodiment of the invention. Referring to FIG. 6, the DDFS block 118 may comprise an accumulator 602 and a digital to analog conversion (DAC) block 604.

The accumulator 602 may comprise suitable logic, circuitry, and/or code that may enable successively adding a control word Q to a value stored in the accumulator on each cycle of a reference clock. The accumulator may receive the control word Q from a processor, such as the processor 725 described in FIG. 7. The accumulator 602 may also receive a signal, $f_{ref}$, from a reference clock such as the signal generator 102 described in FIG. 1. In this regard, the control word Q and the reference signal $f_{ref}$ may determine a phase and/or a frequency of the output signal 606.

The DAC block 604 may comprise suitable logic, circuitry, and/or code that may enable output of a signal of varying phase, frequency, or amplitude. In one embodiment or the invention, the DAC block 604 may comprise a number of lookup tables used to generate output signals, which may drive one or more power amplifiers, such as the amplifier 108 described in FIG. 1.

In operation, the DDFS block 118 may be a digitally-controlled signal generator that may vary a phase, a frequency, and/or an amplitude of one or more output signals based on a single fixed-frequency reference clock, $f_{ref}$, and a control word Q. In operation, the control word may be provided to the accumulator 602, and may be successively added to a value stored in the accumulator on each cycle of the reference clock. In this manner, the sum will eventually be greater than the maximum value the accumulator may store, and the value in the accumulator may overflow or "wrap". Accordingly, an N-bit accumulator will overflow at a frequency $f_o$ given by EQ. 1.

$$f_o = f_{ref}(Q/2^N) \quad \text{EQ. 1}$$

In this manner, the output of the accumulator, θ, may be periodic with period $1/f_o$ and may represent the phase angle of a signal. Providing this phase angle to the DAC block 604 may then allow generation of one or more signals of varying phase, frequency and amplitude. In this regard, the DDFS block 118 may be well suited as a frequency generator that outputs one or more sine waves or other periodic waveforms over a large range of frequencies, from almost DC to approximately half the reference clock frequency $f_{ref}$.

FIG. 7 is a block diagram illustrating an exemplary RF communication device, in accordance with an embodiment of the invention. Referring to FIG. 7, there is shown a RF communication device 720 that may comprise an RF receiver 723a, an RF transmitter 723b, a digital baseband processor 729, a processor 725, and a memory 727. A receive antenna 721a may be communicatively coupled to the RF receiver 723a. A transmit antenna 721b may be communicatively coupled to the RF transmitter 723b. The RF communication device 720 may be operated in a system, such as the cellular network and/or digital video broadcast network, for example.

The RF receiver 723a may comprise suitable logic, circuitry, and/or code that may enable processing of received RF signals. The RF receiver 723a may enable receiving extremely high frequency (EHF) signals of, for example, approximately 60 GHz. In this regard, the receiver may be enabled to generate signals, such as local oscillator signals, for the reception and processing of EHF signals. The RF receiver 723a may down convert received RF signals to a baseband frequency signal. In various embodiments of the invention, the RF receiver 723a may perform direct down-conversion of the received RF signal to a baseband frequency signal. In other embodiments of the invention, the RF receiver 723a may down-convert the RF signal to an IF prior to down-converting to baseband. In some instances, the RF receiver 723a may enable analog-to-digital conversion of the baseband signal components before transferring the components to the digital baseband processor 729. In other instances, the RF receiver 723a may transfer the baseband signal components in analog form.

The digital baseband processor 729 may comprise suitable logic, circuitry, and/or code that may enable processing and/or handling of baseband frequency signals. In this regard, the digital baseband processor 729 may process or handle signals received from the RF receiver 723a and/or signals to be transferred to the RF transmitter 723b. The digital baseband processor 729 may also provide control and/or feedback information to the RF receiver 723a and to the RF transmitter 723b based on information from the processed signals. In this regard, the baseband processor 729 may provide control signals to, for example, the DDFS 118, the delay block 128, the signal generator 102, the LNA 106, and/or the PA 108. The digital baseband processor 729 may communicate information and/or data from the processed signals to the processor 725 and/or to the memory 727. Moreover, the digital baseband processor 729 may receive information from the processor 725 and/or to the memory 727, which may be processed and transferred to the RF transmitter 723b for transmission to the network.

The RF transmitter 723b may comprise suitable logic, circuitry, and/or code that may enable processing of RF signals for transmission. The RF transmitter 723b may enable transmission of extremely high frequency (EHF) signals of, for example, approximately 60 GHz. In this regard, the transmitter may be enabled to generate signals, such as local oscillator signals, for the reception and processing of EHF signals. The RF transmitter 723b may up-convert the baseband frequency signal to an RF signal. In various embodiments of the invention, the RF transmitter 723b may perform direct up-conversion of the baseband frequency signal to RF. In other embodiments of the invention, the RF transmitter 723b may convert the baseband frequency signal to an IF prior to up converting to RF. In some instances, the RF transmitter 723b may enable digital-to-analog conversion of the baseband signal components received from the digital baseband processor 729 before up conversion. In other instances, the RF transmitter 723b may receive baseband signal components in analog form.

The processor 725 may comprise suitable logic, circuitry, and/or code that may enable control and/or data processing operations for the RF communication device 720. The processor 725 may be utilized to control at least a portion of the RF receiver 723a, the RF transmitter 723b, the digital baseband processor 729, and/or the memory 727. In this regard, the processor 725 may generate at least one signal for controlling operations within the RF communication device 720. In this regard, the processor 725 may provide control signals to, for example, the DDFS 118, the delay block 128, the signal generator 102, the LNA 106, and/or the PA 108 The processor 725 may also enable executing of applications that may be utilized by the RF communication device 720. For example, the processor 725 may execute applications that may enable displaying and/or interacting with content received via RF signals in the RF communication device 720.

The memory 727 may comprise suitable logic, circuitry, and/or code that may enable storage of data and/or other information utilized by the RF communication device 720. For example, the memory 727 may be utilized for storing processed data generated by the digital baseband processor 7 29 and/or the processor 7 25. The memory 727 may also be utilized to store information, such as configuration information, that may be utilized to control the operation of at least one block in the RF communication device 720. For example, the memory 727 may comprise information necessary to configure the RF receiver 723*a* to enable receiving signals in the appropriate frequency band.

Aspects of a method and system for transmission and/or reception of signals utilizing a delay circuit 128 and DDFS 118 are provided. In this regard, a first signal 412 may be delayed by 90°, via a plurality of delay elements 406 and variable capacitance 408, to generate a second signal 414. The first and second signals may be mixed to generate a first LO signal 116, which may be utilized for a first frequency conversion. A second LO signal 122 may be generated via a DDFS and may be utilized for a second frequency conversion. A digital input word of the DDFS, a value of the variable capacitance, and/or at least a portion of the delay elements 406, may be programmatically controlled based on a desired frequency for transmission and/or desired frequency for reception. The first frequency conversions may be up-conversions and/or down-conversions to/from baseband, one or more intermediate frequencies, and/or RF.

Another embodiment of the invention may provide a machine-readable storage, having stored thereon, a computer program having at least one code section executable by a machine, thereby causing the machine to perform the steps as described herein for transmission and/or reception of signals utilizing a delay circuit and a direct digital frequency synthesizer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:

delaying a first signal to generate a second signal which is 90° phase shifted relative to the first signal, wherein said delaying is performed utilizing a selected portion of a plurality of delay elements and a variable capacitance;

mixing said first signal and said second signal to generate a first local oscillator signal that is twice a frequency of said first signal, wherein said first local oscillator signal is utilized for a first frequency conversion and said selected portion of said plurality of delay elements is selected based on a signal strength of said first local oscillator signal;

generating, based on said first signal used for said first frequency conversion, a second local oscillator signal utilizing a direct digital frequency synthesizer, wherein said second local oscillator signal is utilized for a second frequency conversion;

up-converting a baseband signal to an intermediate frequency signal utilizing said first local oscillator signal; and up-converting said intermediate frequency to a radio frequency suitable for transmission utilizing said second local oscillator signal.

2. The method according to claim 1, comprising up-converting a first intermediate frequency to a second intermediate frequency utilizing said first local oscillator signal.

3. The method according to claim 1, comprising down-converting a received signal to an intermediate frequency utilizing said second local oscillator signal.

4. The method according to claim 3, comprising down-converting said intermediate frequency to baseband utilizing said first local oscillator signal.

5. The method according to claim 1, comprising down-converting a first intermediate frequency to a second intermediate frequency utilizing said first local oscillator signal.

6. The method according to claim 1, comprising programmably controlling a digital input word of said direct digital frequency synthesizer based on a desired frequency for transmission and/or desired frequency for reception.

7. The method according to claim 1, comprising programmably controlling said at least a portion of said plurality of delay elements based on a desired frequency for transmission and/or desired frequency for reception.

8. The method according to claim 1, comprising programmably controlling said variable capacitance based on a desired frequency for transmission and/or desired frequency for reception.

9. A system for wireless communication, the system comprising:

one or more circuits comprising a plurality of delay elements and a variable capacitance, said one or more circuits enable delay of a first signal to generate a second signal which is 90° phase shifted relative to the first signal, wherein said delaying is performed utilizing a selected portion of said plurality of delay elements and said variable capacitance;

said one or more circuits enable mixing of said first signal and said second signal to generate a first local oscillator signal that is twice a frequency of said first signal, wherein said first local oscillator signal is utilized for a first frequency conversion and said selected portion of said plurality of delay elements is selected based on a signal strength of said first local oscillator signal;

said one or more circuits comprise a direct digital frequency synthesizer, and said one or more circuits enable generation, based on said first signal used for said first frequency conversion, of a second local oscillator signal utilizing said direct digital frequency synthesizer, wherein said second local oscillator signal is utilized for a second frequency conversion;

said one or more circuits enable up-conversion of a baseband signal to an intermediate frequency utilizing said first local oscillator signal; and said one or more circuits enable up-conversion of said intermediate frequency to a radio frequency suitable for transmission utilizing said second local oscillator signal.

10. The system according to claim 9, wherein said one or more circuits enable up-conversion of a first intermediate frequency to a second intermediate frequency utilizing said first local oscillator signal.

11. The system according to claim 9, wherein said one or more circuits enable down-conversion of a received signal to an intermediate frequency utilizing said second local oscillator signal.

12. The system according to claim 11, wherein said one or more circuits enable down-converting said intermediate frequency to baseband utilizing said first local oscillator signal.

13. The system according to claim 9, wherein said one or more circuits enable down-conversion of a first intermediate frequency to a second intermediate frequency utilizing said first local oscillator signal.

14. The system according to claim 9, wherein said one or more circuits enable programmatic control of a digital input word of said direct digital frequency synthesizer based on a desired frequency for transmission and/or desired frequency for reception.

15. The system according to claim 9, wherein said one or more circuits enable programmatic control of said at least a portion of said plurality of delay elements based on a desired frequency for transmission and/or desired frequency for reception.

16. The system according to claim 9, wherein said one or more circuits enable programmatic control of said variable capacitance based on a desired frequency for transmission and/or desired frequency for reception.

17. A method for wireless communication, the method comprising:

delaying a first signal to generate a second signal which is 90° phase shifted relative to the first signal, wherein said delaying is performed utilizing a selected portion of a plurality of delay elements and a variable capacitance;

mixing said first signal and said second signal to generate a first local oscillator signal that is twice a frequency of said first signal, wherein said first local oscillator signal is utilized for a first frequency conversion and said selected portion of said plurality of delay elements is selected based on a signal strength of said first local oscillator signal;

generating, based on said first signal used for said first frequency conversion, a second local oscillator signal utilizing a direct digital frequency synthesizer, wherein said second local oscillator signal is utilized for a second frequency conversion;

down-converting a received signal to an intermediate frequency utilizing said second local oscillator signal; and down-converting said intermediate frequency to baseband utilizing said first local oscillator signal.

18. The method according to claim 17, comprising up-converting a baseband signal to an intermediate frequency signal utilizing said first local oscillator signal.

19. The method according to claim 18, comprising up-converting said intermediate frequency to a radio frequency suitable for transmission utilizing said second local oscillator signal.

20. The method according to claim 17, comprising up-converting a first intermediate frequency to a second intermediate frequency utilizing said first local oscillator signal.

21. The method according to claim 17, comprising down-converting a first intermediate frequency to a second intermediate frequency utilizing said first local oscillator signal.

22. The method according to claim 17, comprising programmably controlling a digital input word of said direct digital frequency synthesizer based on a desired frequency for transmission and/or desired frequency for reception.

23. The method according to claim 17, comprising programmably controlling said at least a portion of said plurality of delay elements based on a desired frequency for transmission and/or desired frequency for reception.

24. The method according to claim 17, comprising programmably controlling said variable capacitance based on a desired frequency for transmission and/or desired frequency for reception.

25. A system for wireless communication, the system comprising:

one or more circuits comprising a plurality of delay elements and a variable capacitance, said one or more circuits enable delay of a first signal to generate a second signal which is 90° phase shifted relative to the first signal, wherein said delaying is performed utilizing a selected portion of said plurality of delay elements and said variable capacitance;

said one or more circuits enable mixing of said first signal and said second signal to generate a first local oscillator signal that is twice a frequency of said first signal, wherein said first local oscillator signal is utilized for a first frequency conversion and said selected portion of said plurality of delay elements is selected based on a signal strength of said first local oscillator signal;

said one or more circuits comprise a direct digital frequency synthesizer, and said one or more circuits enable generation, based on said first signal used for said first frequency conversion, of a second local oscillator signal utilizing said direct digital frequency synthesizer, wherein said second local oscillator signal is utilized for a second frequency conversion;

said one or more circuits enable down-conversion of a received signal to an intermediate frequency utilizing said second local oscillator signal; and said one or more circuits enable down-converting said intermediate frequency to baseband utilizing said first local oscillator signal.

26. The system according to claim 25, wherein said one or more circuits enable up-conversion of a baseband signal to an intermediate frequency utilizing said first local oscillator signal.

27. The system according to claim 26, wherein said one or more circuits enable up-conversion of said intermediate frequency to a radio frequency suitable for transmission utilizing said second local oscillator signal.

28. The system according to claim 25, wherein said one or more circuits enable up-conversion of a first intermediate frequency to a second intermediate frequency utilizing said first local oscillator signal.

29. The system according to claim 25, wherein said one or more circuits enable down-conversion of a first intermediate frequency to a second intermediate frequency utilizing said first local oscillator signal.

30. The system according to claim 25, wherein said one or more circuits enable programmatic control of a digital input word of said direct digital frequency synthesizer based on a desired frequency for transmission and/or desired frequency for reception.

31. The system according to claim 25, wherein said one or more circuits enable programmatic control of said at least a portion of said plurality of delay elements based on a desired frequency for transmission and/or desired frequency for reception.

32. The system according to claim 25, wherein said one or more circuits enable programmatic control of said variable capacitance based on a desired frequency for transmission and/or desired frequency for reception.

* * * * *